LINE STRUCTURE ELIMINATION IN CATHODE RAY TUBES

Filed Sept. 19, 1952

INVENTORS
SIMEON I. TOURSHOU
& IOURY G. MALOFF
BY [signature]
ATTORNEY 2,728,013

LINE STRUCTURE ELIMINATION IN CATHODE RAY TUBES

Simeon I. Tourshou, Philadelphia, Pa., and Ioury G. Maloff, Pennsauken, N. J., assignors to Radio Corporation of America, a corporation of Delaware Application September 19, 1952, Serial No. 310,512

11 Claims. (Cl. 313—92)

The present invention relates to new and useful improvements in cathode ray tubes such as are employed in television receivers.

More particularly, the present invention relates to means for improving the appearance of the raster on the face of the kinescope. In cathode ray tubes, generally, and, more acutely, in such tubes of the larger variety, there has been the problem of seeing discrete horizontal lines on the face of the tube. These discrete lines which are, of course, the scanning lines, are most objectionable in large kinescopes, since the conventional 525 interlaced line raster pattern must be spread in a vertical direction for large faced tubes, which leaves, when adjusted for best focus or definition, well-defined dark lines between the scanning lines.

It is a primary object of the present invention to eliminate the objectionable "line structure" visible on the face of cathode ray tubes.

Since the problem as set forth above has long been appreciated by persons skilled in the art, various methods have been devised by prior investigators in their attempts to alleviate the situation. For example, one well known scheme, referred to as "spot wobble," involves the extremely rapid vertical oscillation of the electron beam as it scans across the face of the tube, the intention being that of presenting a horizontal scanning line which actually comprises a very high frequency vertically deflected beam so that the vertical dimension of the line is substantially greater than the normal dimension of such line, thereby "filling in" the usual gaps between adjacent scanning lines.

"Spot wobble" has proved to be somewhat impractical, both because of the additional circuits required by the system and the problem of interference by radiation resulting from the high frequency deflecting wave employed in spot wobble systems, these waves being in the upper region of the frequency range of the video signal.

It is, therefore, another object of the present invention to provide means for minimizing or eliminating "line structure," which means are optical rather than electronic in nature.

More specifically, it is an aim of the present invention to eliminate line structure by a relatively simple optical addition to the kinescope tube.

The idea of spreading the horizontal scanning lines of a kinescope in a vertical direction for the purpose of effectively bringing adjacent scanning lines closer together has also been a subject of experiment by persons in the field of optics. For example, one known system designed for alleviating the condition in question is that disclosed in the patent granted to Arni et al. 2,254,057. This patent discloses means for causing adjacent horizontal scanning lines to appear contiguous, the means taught by the patent being in the nature of reflecting surfaces disposed before the cathode ray tube in such manner that the reflecting surfaces act like a "Venetian blind" in vertically widening out the light spot which emanates from the fluorescent screen. The patented system, moreover, apparently requires that there be a reflecting surface for each horizontal scanning line. While the means provided by the patent may indeed be effective to some extent, there is obviously a great problem of registration presented in practicing the patented system, since each reflecting surface must be in proper alignment with its associated scanning line.

A further object of the present invention, therefore, is to provide optical means for eliminating spaces between horizontal scanning lines on a kinescope face, which means presents no critical problem of registration with the several lines.

In general, the present invention contemplates the disposition in front of a kinescope face of a lenticulated screen of grass, plastic or other suitable light conducting material, the screen being provided with a plurality of lenticular cylindrical lenses for each of the horizontal scanning lines. In the practice of the invention, the specifications of the lens curvature are designed in a manner which permits the lenticular screen to eliminate line structure without introducing any error into the system.

A further object of the present invention is to provide lenticular lenses for the elimination of line structure, which screen is easy and inexpensive to produce.

Further objects and advantages of the present invention will become apparent to persons skilled in the art from a study of the following detailed description of the attached drawings wherein.

Figures 1, 5:
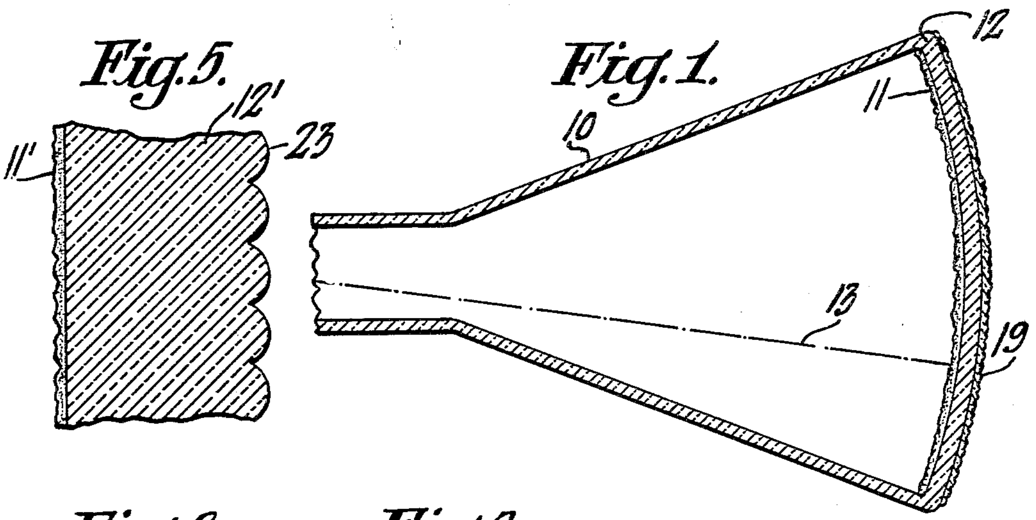
Fig. 1 is a fragmentary elevational view of a kinescope provided with a lenticulated screen according to one embodiment of the present invention.
Figures 2, 2A, 3, 4:
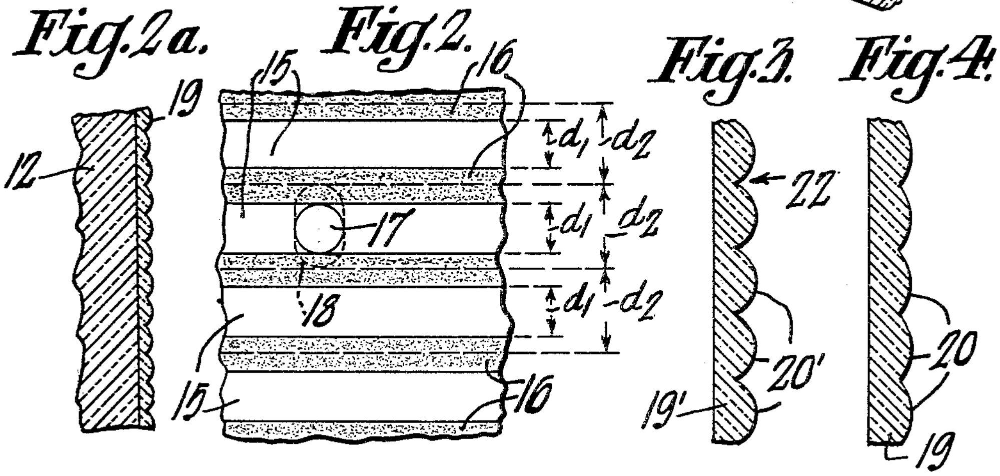
Fig. 2 is a diagrammatic showing of the "line structure" sought to be eliminated by the present invention.

Fig. 2*a* is a fragmentary edge view of the illustration of Fig. 2;

Figs. 3 and 4 illustrate various dimensional characteristics of the lenticular screen of the invention; and Fig. 5 is a fragmentary, vertical sectional view illustrating a modified form of the invention.

Figures 6, 7:
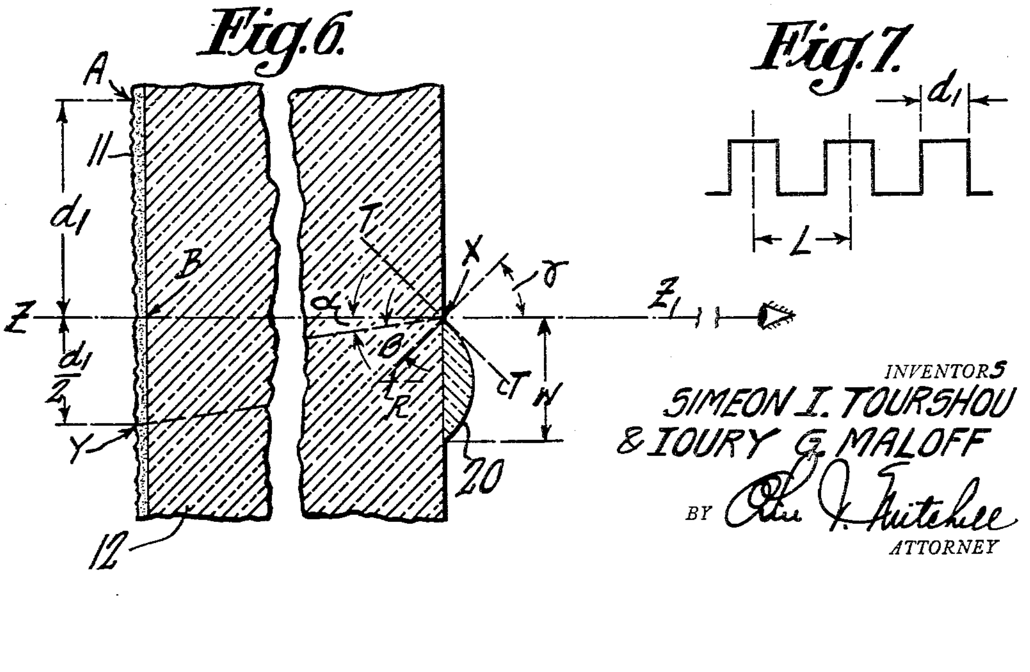

Figs. 6 and 7 illustrate certain theoretical and trigonometric relationships to be referred to in the description of the invention.

Referring to the drawings, and, more particularly, to Fig. 1, reference numeral 10 indicates generally a cathode ray tube or kinescope of the type conventionally used in television receivers, the tube being provided with a phosphor layer 11 on the inner surface of the face 12 of the tube. As persons skilled in the art will appreciate, the face or end wall 12 of a large kinescope such as shown at 10 is normally in the neighborhood of 0.300" in thickness so that it may withstand the atmospheric pressure acting upon the tube. An electron beam 13 which strikes phosphor screen 11 causes the screen to produce a spot of light and, by means of horizontal deflecting circuits known in the art (not shown), the spot of light is caused to scan or travel horizontally across the face of the tube 10. Vertical deflection circuits which are also well known in the art and, for that reason, are not shown, are employed to move the scanning beam downwardly at the beginning of each scanning line to a new position spaced a discrete amount from the preceding line. In large sized kinescopes such, for example, as the "27-inch" type, where the electron beam has been adjusted for best focus, the spacing between individual scanning lines is great enough to be noticeable to the observer and, therefore, is rather objectionable, since the same number of scanning lines, that is, 525 interlaced lines in conventional practice in this country, is applied to large sized tubes as well as the smaller sizes.

Fig. 2 illustrates schematically, and in a greatly magnified fashion, a plurality of horizontal scanning lines 15 as they normally appear on the face of the kinescope 10, the shaded areas 16 being used to denote the dark spaces between the scanning lines. In the drawings, each of the scanning lines 15 is shown as having a specific vertical dimension $d_1$, which dimension, of course, depends for its value upon various factors within the kinescope. As stated above, it is a primary object of the present invention to widen each of the scanning lines 15 vertically so that the shaded areas 16 representing the dark, unscanned portions of the kinescope face will be decreased in their vertical dimension. The optimum amount of such widening of scanning lines 15 would be such that each of the lines 15 would have a vertical dimension as shown in the drawing at $d_2$. It will be noted that, where each of the scanning lines is equal in size to dimension $d_2$, the adjacent scanning lines 15 are exactly contiguous so that no unlighted areas appear between the lines. Stated in other manner, if it be assumed that the scanning spot produced on the face of kinescope 12 by electron beam 13 acting on phosphor screen 11 be of the size indicated at 17 in Fig. 2, the effect to be produced by the present invention is that of widening the spot 17 vertically so that it appears in the shape of the dotted-line area 18. It will be understood, therefore, that, with the spot size enlarged as shown at 18, the scanning line resulting from the sweeping of such spot across the face of the tube will have a vertical dimension equal to $d_2$.

According to one form of the invention, the desired widening of the scanning line in a vertical direction is effected by placing a screen 19 in front of the end wall 12 of the kinescope. Screen 19, which may be fashioned from glass or plastic having the necessary light-transmitting characteristics is provided with a plurality of lenticulations 20 as best shown in Figs. 2*a* through 4, inclusive. Each of the lenticular lenses 20 is disposed parallel to the scanning lines 15 so that the magnifying action of the lenses 20 occurs only in the dimension perpendicular to the direction of the scanning lines or, in other words, in the vertical dimension.

Experimentation has shown that certain specifications as to size and radius must be met by the lenticular lenses in order for the scanning line to be widened vertically without introducing any objectionable distortion or other error. More particularly, in the case of a kinescope tube 10 having a raster area defined by a base of 24 inches and an altitude of 18 inches (i. e., a "27 inch rectangular" cathode ray tube), the following specifications are necessary for optimum action of the lenticulated screen: In a tube of this size, the end wall 12 is normally in the range of 0.300 to 0.45 inch in thickness. It has been found that, for this case, a lenticulated screen having approximately 100 lenticulations or lenticular lenses per inch provides optimum service in spreading the scanning lines 15 vertically from dimension $d_1$ to dimension $d_2$. More specifically, it should be noted that where fewer lenticular lenses per inch are employed, for example, 50 lenticulations, the coarse structure of the lenticulations themselves may become apparent, resulting in the appearance of horizontal streaks. On the other hand, where a screen 19 having considerably more than 100 lenticulations per inch is employed, for example, 200 lines, the lines defining the lenses are so close to each other that screen 10 acts in the manner of a diffraction grating in that ambient or stray light within the room which is reflected from the lenticular screen gives the appearance of a faint rainbow superimposed on the kinescope face. This, of course, can be objectionable, depending upon the amount of such diffraction. The upper limit of the number of lenticulations per inch will, therefore, depend upon the point at which the colors become apparent and, therefore, objectionable to the observer.

Approximate calculations will indicate, and Fig. 2*a* is intended to show schematically in connection with Fig. 2, that, in the case of a kinescope of the "27-inch" type used with a screen having 100 lenticulations per inch, there will be approximately three lenticulations, 20 for each scanning line centerline. This specific ratio, however, does not appear to be critical, since a screen having 100 lenticulations per inch may also be used successfully with kinescopes of smaller size, such as "17-inch" and "21-inch" tubes. The optimum quantity, however, is dependent upon the upper and lower limits as set forth supra and apparently requires only that there be a sufficient number of lenses per scanning line to produce the desired magnification or spread without horizontal streaks becoming apparent, while being fewer in number than that which results in the "diffraction grating" effect described.

Still another specification of the lenticular screen 19 which must be adhered to in order for its proper services to be obtained is the specific radius of curvature of each of the lenticular lenses 20. Experimental activity has shown that the optimum radius of curvature for use with a tube such as has been described lies in the neighborhood of 0.055 inch. The lower limit of the particular dimension 21 is determined in accordance with the schematic showing of Fig. 3 in which is illustrated, in section, a portion of a lenticular screen 19' comprising a plurality of lenticulations 20'. In the screen of this figure, the lenticular lenses 20 are of a radius of curvature considerably less than the optimum of 0.055 inch and may be considered, for example, as being 0.009 inch. Persons skilled in the art will realize the fact that, with the sharp corners 22 between the lenticulations 20', the light rays passing through each of the lenses 20' at its "corners" will be bent away from their desired path so that they will appear to the observer as originating at a point spaced vertically on the tube face 12 from the actual point of origin of such light rays. The bending of the light results in the observer's seeing three apparent lines or images instead of the single actual line. This "corner effect" is, therefore, undesirable and determines the minimum radius of curvature which may be chosen for the lenticular lenses.

The optimum value of the radius of curvature may be calculated in accordance with the trigonometric relationships of the radius to certain reference points, as illustrated by Fig. 6. In Fig. 6, there is depicted a greatly enlarged fragmentary, sectional view of a portion of a kinescope end wall 12 having a phosphor layer 11. Only one cylindrical lens 20 is shown, for reasons of simplification, and it may be assumed that the width $w$ of this lens has been chosen as the optimum 0.01 inch. Further assumptions which may be made for purposes of this calculation are that the index of refraction ($n$) of the glass face 12 and screen 19 is 1.5 (which is approximately the index of such commercial glass) and that the total thickness $t$ of the face 12 and screen 19 is approximately equal to 0.3 inch.

Additional values required may be determined by careful measurements and these have been found, in the usual case, to be approximately as follows, as illustrated graphically by Fig. 7:

$L$ (spacing between centerline of adjacent scanning lines) = 0.0367″

$d_1$ (width of a focused scanning line) = 0.0183″

Observation has further demonstrated the fact that in a typical case, such as is found in a "27-inch" kinescope, the space between adjacent focused lines is nearly equal to the width "$d_1$" of such lines and the problem, therefore, may be considered that of computing the radius of curvature R necessary for an apparent "movement" of the edge of the scanning spot a distance of $$\frac{d1}{2}$$

or half the width of the normally dark space. This "spread" of $$\frac{d1}{2}$$

will, therefore, be the basis of the calculations made infra.

In the drawing (Fig. 6) the upper edge of the scanning line is indicated by the point "Y." It is desired to move the apparent edge upward a distance $$\frac{d_1}{2}$$

This distance may be laid out on the drawing, its termination being indicated by reference character B. Line Z—Z is drawn perpendicular to the point B as a reference line for further construction. The line X—Y is thus at an angle $\alpha$ to the reference line Z—Z and the unknown radius R is drawn to point X, forming angle $\beta$ with line X—Y. The extension of R forms angle $\gamma$ with reference line Z—Z and it is obvious that $\gamma$ equals $\alpha+\beta$.

Line T—T is a line drawn tangent to the cylindrical lens at point X where radius line R intersects line Z—Z.

From the drawing, it will be seen that certain basic relationships exist, as follows:

$$\tan\alpha=\frac{d_1}{2t} \qquad (1)$$

$$\sin\gamma=n\sin\beta \qquad (2)$$

Equation 2 is a fundamental relation for refraction of a light ray falling at angle of incidence $\gamma$ on a surface of light transmitting medium of index of refraction $n$, the position of the surface being indicated by line TT. The ray then proceeds through the medium in the direction forming an angle $\beta$ to the normal to the surface indicated by line TT.

$$\gamma=\alpha+\beta \qquad (3)$$

$$\sin\gamma=\frac{W}{2}\frac{1}{R} \qquad (4)$$

From (2) and (3), $$n\sin\beta=\sin\alpha\cos\beta+\cos\alpha\sin\beta$$

$$(n-\cos\alpha)\sin\beta=\sin\alpha\cos\beta$$

$$n-\cos\alpha=\frac{\sin\alpha}{\tan\beta}$$

$$\tan\beta=\frac{\sin\alpha}{n-\cos\alpha} \qquad (5)$$

From (2) and (4), $$R=\frac{W}{2n\sin\beta} \qquad (6)$$

From (1), $$\sin\alpha=\frac{d_1}{\sqrt{4t^2+d_1^2}}=A$$

and $$\cos\alpha=\frac{2t}{\sqrt{4t^2+d_1^2}}=B$$

Substituting in Equation 5, therefore, $$\tan\beta=\frac{A}{n-B}$$

and $$\sin\beta=\frac{A}{\sqrt{A^2+(n-B)^2}} \qquad (7)$$

From Equations 6 and 7, it may be seen that $$R=W\frac{\sqrt{A^2+(n-B)^2}}{2nA}$$

or $$R=\frac{W}{2nd_1}\sqrt{(n\sqrt{4t^2+d_1^2}-2t)^2+d_1^2} \qquad (8)$$

When $d_1^2 \ll t^2$, Equation 8 becomes $$R=\frac{Wt}{nd_1}(n-1) \qquad (9)$$

In the example, therefore of a "27 inch" kinescope tube with a "picture height" of 18 inches, the theoretical line width is 18/500 (allowing for the 25 lines which are lost during retrace) or 0.036". If the spacing between adjacent scanning lines appears to be equal to the actual line width, then $d_1$ equals 0.018" and, for a line "spread" of $$\frac{d_1}{2}$$

Equation 9 becomes $$R=\frac{0.010\times 0.300}{1.5\times 0.018}\times 0.5$$

and $$R=0.055''$$

It should be noted, as stated generally above, that, in no event, should the spread be greater than $d_1$, for with spreads of more than that value, a "tripling" effect occurs (i. e. each scanning line appears through the screen as three distinct lines rather than as one wide line).

In order to illustrate by comparison the difference between the screen of Fig. 3 and one having lenses of the optimum radius of curvature, Fig. 4 shows schematically a lenticular screen wherein each of the lenses 20 is approximately 0.055 inch in radius.

Lenticular screens such as that denoted at 19 in Fig. 4 may be produced by cutting a negative of the desired lenticulations into a sheet of metal which is then employed as a mold member wherein a suitable plastic such as a copolymer of vinyl chloride and vinyl acetate may be compression molded. The resulting molded sheet will be provided with raised portions 20 having the desired width and radius of curvature.

For successful operation of the present invention, the plastic screen 19 should be placed as close to the end wall 12 of the kinescope as is practicable. One method which may be employed for doing this is that of softening the plastic screen by heating it slightly and then pressing the softened plastic sheet onto the end wall 12 so that, as the plastic sheet cools, it will set in the shape of the end wall. It will be apparent to those skilled in the art that care should be taken to orient the lenticulations 20 so that they are substantially parallel to the horizontal, or the direcion of scanning.

In operation, with the lenticular screen 19 disposed as set forth above across the face 12 of the kinescope, the electron beam 13 which scans across the phosphor screen 11 produces a spot of light at the screen by virtue of the excitation of the phosphor, so that the light emanates from the end wall 12 of the tube. As shown in the drawings and, more particularly, in Fig. 2, the spot of light would normally appear as at 17, in the absence of the lenticular screen. By virtue of the magnifying action of the lenticular lenses 20, however, the spot is spread vertically to the size shown by dotted lines at 18. The resultant scanning line produced by horizontal deflection of the electron beam will, therefore, have a vertical dimension equal to $d_2$ rather than the smaller dimension $d_1$ and adjacent scanning lines will, because of their spread, appear to the observer as contiguous lines with no dark spaces between them.

It has been found, and will be appreciated from a study of the above that, since the scanning spot is spread only in the vertical dimension and not at all horizontally, no problems of horizontal resolution are produced by the screen 19. Furthermore, the vertical resolution is not caused to suffer by the spread if the screen is provided with the proper number of lenticulations per inch, as discussed supra.

Another form of the invention is illustrated in Fig. 5 wherein the lenticular lenses 23 are formed directly in the glass end wall 12′ of the kinescope. Light resulting from excitation of the phosphor screen 11′ by a scanning electron beam will be spread vertically by lenticulations 23 in the same manner as was described for the preceding figures.

It should also be borne in mind that, while the foregoing description discloses means for producing the optimum optical results in spreading the scanning lines vertically, acceptable results may also be obtained through devices approaching this optimum. For example, spread of the lines in only their vertical dimension may be produced despite discontinuity of the lenticulations or "lens elements." That is to say, random lens elements, if properly and uniformly oriented (i. e. in the horizontal direction) may be used to accomplish an improvement over the prior art, assuming that the random "lens elements" (which may be, for example, from ¼ to one inch in length) are of such dimension (i. g. width and curvature) that they produce the desired optical effect. One mode of making a screen of this type would be that of scratching a plastic sheet, as by means of a cutting device, so that all of the scratches extend horizontally across the sheet and define, between vertically adjacent scratches, "lens elements" having the desired optical properties. Instead of scratching the plastic sheet (or kinescope face), random-length, but oriented grooves may be made therein by etching the same with a suitable acid. In using this method, however, care must be taken to insure proper orientation of the etched grooves, as by vibrating the work and/or acid in substantially only one direction. The scratches or grooves thus produced should, however, be somewhat cylindrical or elliptical in cross-section and should be of such radius (or radii, in the case of non-cylindrical lens elements) as to effect an acceptable spread of the scanning lines. A practical advantage of these embodiments is that of the lower cost of production. Also, it has been found that the random lens elements permit the use of a greater number of such elements per vertical inch of the screen, since the discontinuity apparently results in less light diffraction from a given number of "lines per inch."

In view of the above, it will be appreciated by persons skilled in the art that the cylindrical lens elements described in connection with the optimum device may also be discontinuous, rather than continuous, while still affording acceptable spread of the scanning lines such as will effectively eliminate line structure.

Further changes within the scope of the appended claims will also suggest themselves to persons skilled in the art and, for that reason, the specific embodiments disclosed are intended to serve as examples.

Having thus described my invention, what I claim as new and desire to secure by Letters Patent is:

1. A device adapted to reduce the apparent spacing between adjacent scanning lines of a kinescope raster which comprises a screen adapted to be disposed in front of said raster, said screen being provided with a plurality of lenticulations disposed generally parallel to the direction of said scanning lines, these being a plurality of such lenticulations for each such scanning line, whereby each of said lines is magnified in its dimension normal to its direction of scan.

2. A device as set forth in claim 1 wherein each of said lenticulations is approximately 0.01 inch in width.

3. A device as defined by claim 1 wherein each of said lenticulations has a radius of curvature approximately equal to $$2\frac{W}{nd}(n-1)$$

where:

$W$=the width of the lenticulation,
$n$=the index of refraction of the screen, and
$d$=the width of the focused line prior to magnification, whereby each of said scanning lines will be magnified to approximately twice its normal width.

4. A device as set forth in claim 1 wherein each of said lenticulations has a radius of curvature between 0.009 inch and 0.06 inch.

5. A device as defined by claim 4 wherein said radius of curvature is approximately 0.025 inch.

6. A device as set forth in claim 1 wherein said lenticulations are not fewer than 50 per inch nor in excess of 200 lenticulations per linear inch of said screen.

7. Means for reducing the apparent spacing between adjacent scanning lines of a scanning raster which appears on the face of a kinescope, said means comprising a plurality of lenticular lenses on said kinescope face, generally parallel to said scanning lines, each of said lenses being sufficiently narrow as to reproduce said scanning lines without distortion and having a radius of curvature in the range of 0.009 to 0.06 inch.

8. Means for reducing the apparent spacing between adjacent kinescope raster lines as defined by claim 7 wherein said lenses are integral with said kinescope's face.

9. Means for reducing the apparent spacing between adjacent kinescope raster lines as defined by claim 7 wherein said lenses form a screen adapted to be disposed against said kinescope.

10. Means for reducing the apparent spacing between adjacent kinescope raster lines as defined by claim 9 wherein said screen comprises a sheet of light-transmitting plastic material.

11. A device for reducing the apparent spacing between adjacent scanning lines of a kinescope raster which comprises a screen disposed in front of such raster, said screen being provided with a plurality of elongated lens elements disposed generally parallel to the direction of such scanning lines and being of substantially smaller dimension in the direction perpendicular to said scanning direction than the corresponding dimension of such line, whereby each of such lines is magnified without distortion in its dimension normal to its direction of scan.

References Cited in the file of this patent

UNITED STATES PATENTS

| | | |
|---|---|---|
| 2,091,152 | Malpica | Aug. 24, 1937 |
| 2,201,245 | Ruska et al. | May 21, 1940 |
| 2,354,591 | Goldsmith | July 25, 1944 |
| 2,479,820 | De Vore | Aug. 23, 1949 |
| 2,495,697 | Chilowsky | Jan. 31, 1950 |
| 2,567,656 | Siezen | Sept. 11, 1951 |
| 2,605,349 | Homrighous | July 29, 1952 |
| 2,652,499 | Argabrite | Sept. 15, 1953 |